United States Patent [19]
Miller

[11] 3,792,546

[45] *Feb. 19, 1974

[54] REEL SECURING DEVICE

[75] Inventor: Earl E. Miller, Dowagiac, Mich.

[73] Assignee: Victor Comptometer Corporation, Chicago, Ill.

[ * ] Notice: The portion of the term of this patent subsequent to May 19, 1990, has been disclaimed.

[22] Filed: Apr. 9, 1970

[21] Appl. No.: 26,813

[52] U.S. Cl. .................................................. 43/22
[51] Int. Cl. ............................................. A01k 87/06
[58] Field of Search ........................................ 43/22

[56] References Cited
UNITED STATES PATENTS

| 2,379,578 | 7/1945 | Heddon | 43/22 |
| 1,962,869 | 6/1934 | Heddon | 43/22 |
| 3,196,572 | 7/1965 | Steinle | 43/22 |
| 3,197,908 | 8/1965 | Hirsch | 43/22 |
| 3,102,358 | 9/1963 | Steinle | 43/22 |

Primary Examiner—Louis G. Mancene
Assistant Examiner—Daniel J. Leach
Attorney, Agent, or Firm—Bruce G. Klaas, Esq.

[57] ABSTRACT

A reel securing device for detachably securing a fishing reel to the reel mounting section of a fishing rod comprising a movable clamping hood which engages one end of the base plate reel. The hood is fabricated of a synthetic relatively resilient and deformable material and is adjustably mounted by means of an adjusting screw which is adapted to journal support the clamping hood in an extremely simple and economical manner.

9 Claims, 5 Drawing Figures

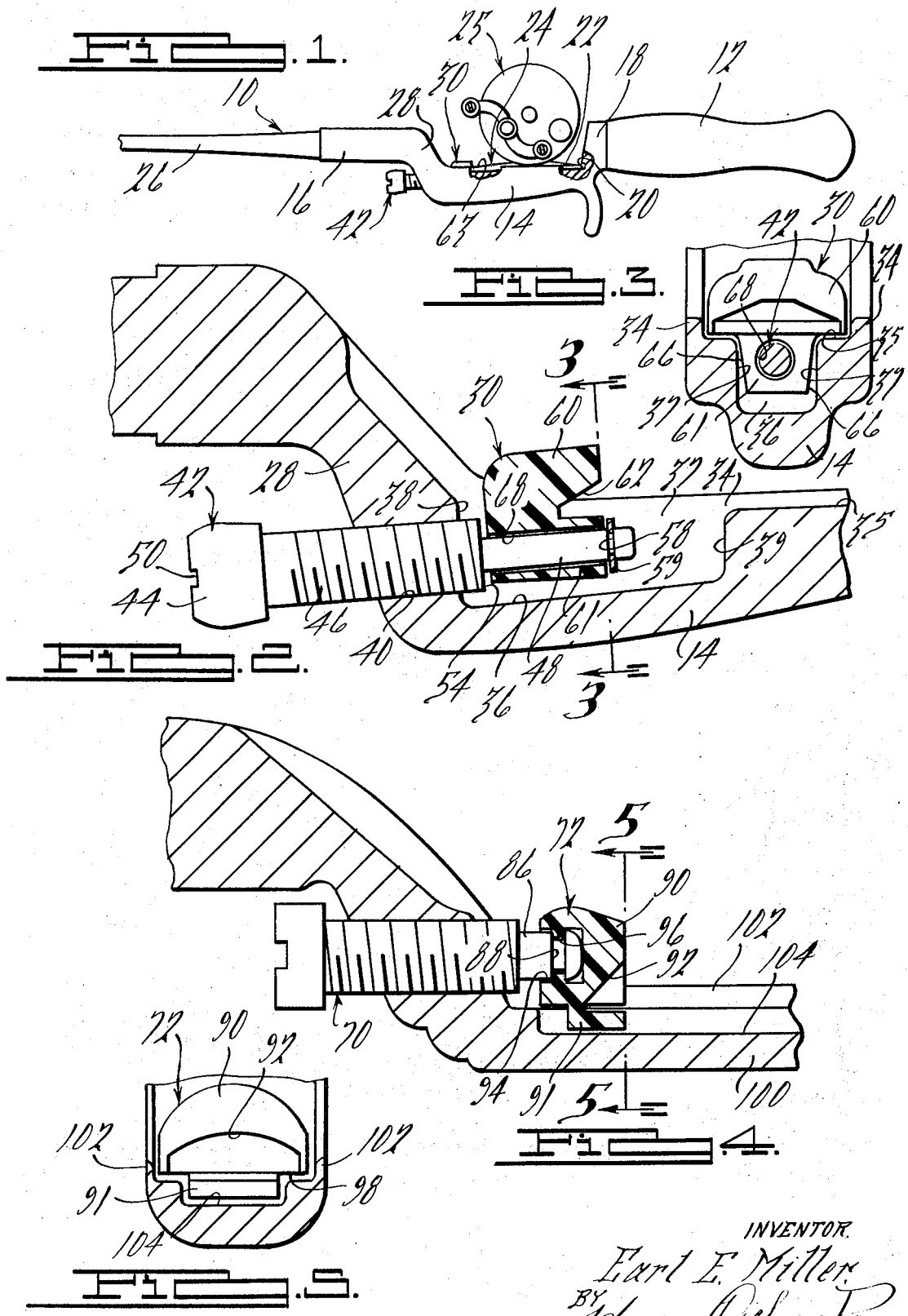

3,792,546

REEL SECURING DEVICE

BACKGROUND OF THE INVENTION

In conventional fishing rods, such as casting rods, a reel seat is provided adjacent one longitudinal end of the rod handle, with the seat usually being formed by a laterally offset section of the rod. One longitudinal end of the reel seat is provided with means, conventionally in the form of a recess or undercut, for nestingly receiving one end of the reel base plate. The opposite end of the reel seat is provided with some sort of a movable clamping member or hood defining an opposing undercut or recess and adapted to be adjustably mounted in a manner such that the hood is movable toward and away from clamping engagement with the adjacent end of the reel base plate so as to fixedly secure the reel upon the reel seat. It is in this area where the improvement of the present invention addresses itself.

SUMMARY OF THE INVENTION

This invention relates in general to means for attaching fishing reels to associated fishing rods and, more particularly, to a novel reel clamping hood and its associated means for adjustably moving the hood toward and away from operative engagement with one end of a fishing reel mounting or base plate.

It is accordingly a general object of the present invention to provide a new and improved securing device for detachably mounting fishing reels on associated fishing rods.

It is a more particular object of the present invention to provide a new and improved reel securing device of the above character that is in the form of a traveling hood which is fabricated of a resilient deformable or compressible material which is adapted to positively lockingly secure fishing reels on associated fishing rods.

It is another object of the present invention to provide a new and improved reel securing device of the above character that is fabricated of a corrosion resistant material and which may therefore be used in corrosive atmospheres such as exist in salt water fishing environments It is still another object of the present invention to provide a new and improved reel securing device of the above character wherein the hood member is adapted to be fabricated as by molding or the like, whereby to obviate complicated and expensive machining operations heretofore required.

It is yet another object of the present invention to provide a new and improved reel securing device which is adapted to be journal supported on an associated adjustment screw in a manner so as to obviate ancillary retaining pins and associated pin receiving bores or the like heretofore required in prior known reel securing devices, such as are shown in U.S. Pat. No. 1,962,869.

It is a related object of the present invention to provide a new and improved reel securing device of the above described type which is of an extremely simple design, that is easy to assemble and which will have a long and durable operational life.

Other objects and advantages of the present invention will become apparent from the following detailed description taken in conjunction with the accompanying drawing.

BRIEF DESCRIPTION OF THE DRAWING

FIG. 1 is a side elevational view of the handle portion of a conventional fishing rod having one embodiment of the reel securing device of the present invention in operative association therewith;

FIG. 2 is an enlarged fragmentary longitudinal cross-sectional view of a portion of the fishing rod illustrated in FIG. 1;

FIG. 3 is a transverse cross-sectional view taken substantially along the line 3—3 of FIG. 2;

FIG. 4 is a view similar to FIG. 2 illustrating an alternate embodiment of the present invention; and FIG. 5 is a transverse cross-sectional view taken substantially along the line 5—5 of FIG. 4.

DETAILED DESCRIPTION OF THE PREFERRED EMBODIMENTS

With reference to FIG. 1, a conventional fishing rod 10 is shown as comprising a rear grip or handle portion 12, a downwardly offset reel seat portion 14, and a forward socket section 16. The right or rearward end of the reel seat portion 14 is integrally connected to the left or forward end of the rear grip portion 12 by the formation of a rear transverse wall 18 which is undercut at its base to provide a socket recess 20 adapted to nestingly receive a rear end portion 22 of a reel base plate 24 of a conventional fishing reel 25, in a manner well known in the art. The forward socket section 16 is adapted to telescopically or otherwise engage the butt end of an elongated line guide section 26 of the fishing rod 10 and is integrally connected at its right or rearward end to the downwardly offset reel seat portion 14 via an integral rod section 28.

As best seen in FIGS. 2 and 3, the reel seat portion 14 is formed with a pair of longitudinally extending, laterally spaced, upwardly projecting flange portions 34 defining a generally horizontal reel base engaging surface portion 35 therebetween. The flange portions 34 are adapted to serve as a guideway means to achieve directional alignment for the reel base plate 24 and provide longitudinal guidance for a movable reel clamping means in the form of a hood like member 30, as will hereinafter be described. Additional guidance for the movable clamping means 30 is provided by a longitudinally extending guide slot 36 which consists of a rectangular depression formed at the forward end of the surface portion 35 with laterally inwardly and downwardly tapered longitudinal walls 37 and generally vertical front and rear walls 38 and 39, respectively. Threaded mounting means in the form of an internally threaded, longitudinally extending bore 40 is provided in the rod section 28 and is adapted to threadably receive a manual adjustment screw means 42. As illustrated, the screw 42 comprises an operating head section 44, a central externally threaded body section 46, and a reduced diameter, cylindrically shaped longitudinally extending spindle means 48. The operating head 44 is of slightly larger diameter than the body section 46 and is knurled or serrated around its outer periphery to provide for non-slip manual engagement thereof by the operator. A diametrically extending slot 50 is also formed on the longitudinally outer end of the head section 44 for reception of the blade of a screw driver or similar type tool, thereby permitting use of a supplemental means with additional mechanical advantage for effecting rotation of the screw 42. A radially extending shoulder means 54 is defined at the juncture of the screw sections 46 and 48 and serves as an abutment means in the form of a surface against which the forward end of the clamping hood 30 means is engaged to provide connecting means therebetween. The end of the spindle section 48 opposite the shoulder 54 is formed with an annular groove 58 which is adapted to carry a suitable "snap" retaining ring or the like 59 that provides a second abutment means in the form of shoulder means which cooperates with the shoulder 54 in providing connecting means therebetween securing the clamping hood means 30 against any relative longitudinal movement with respect to the screw 42.

Rotation of the screw 42 is intended to provide for longitudinal forward and rearward movement of the integral spindle section 48 thereof and hence longitudinal movement of the clamping hood means 30 which is adapted to be attached thereto, in a manner hereinafter to be described.

In accordance with one of the principles of the present invention, the movable clamping hood means 30 is fabricated of a one piece body of resilient, deformable synthetic plastic material, such as Nylon, Delrin, or the like, and generally comprises an upper body position 60 and an integral lower guideway portion 61. The body portion 60 is formed with an undercut in the rearward end thereof which defines a socket or recess 62 having an inclined upper surface adapted for nesting engagement and reception of a forward end portion 63 of the reel base plate 24. It will be seen that the laterally marginal edge surfaces of the body portion 60 extend laterally outwardly into close proximate relation with the reel seat flange portions 34 and thereby cooperate with the portions 34 in providing for longitudinal guidance of the clamping means 30 upon adjustment thereof with respect to the associated fishing reel 25.

The guideway portion 61 of the clamping means 30 is formed with inwardly tapered side walls 66 which extend downwardly from the lower side of the body portion 60 at positions spaced laterally inwardly from the outer marginal edges thereof. The width and depth of the portion 61 are slightly smaller than the corresponding width and depth of the guide slot 36, thereby providing for slidable guidance of the movable clamping means 30 in its forward and rearward travel. The guideway section 61 is further provided with a longitudinally extending aperture 68 of slightly larger diameter than the spindle section 48 of the adjusting screw 42, whereupon insertion of the section 48 through the aperture 68, the clamping means 30 will be journal supported thereon. It will be seen that rotational movement of the adjusting screw 42 will produce fore and aft movement of the movable clamping means 30, and due to the journal engagement between the screw 42 and clamping means 30, rotational movement of the screw 42 will not impart rotation to the clamping means 30.

In operation of the present invention, the clamping means 30 may be initially moved forwardly or away from the handle portion 12 of the rod 10 through suitable rotational movement of the screw 42, whereby to permit the fishing reel 25 to be mounted upon the rod 10. At such time as the clamping means 30 has been fully retracted, the reel 25 may be oriented upon the reel seat portion 14 of the rod 10 in the manner best illustrated in FIG. 1. The rear end 22 of the reel base plate 24 is nestingly inserted within the recess 20, whle the forward end of the plate 24 is adapted for insertion into the recess 62. The adjustment screw 42 is thereafter properly rotated to cause the clamping means 30 to move rearwardly, whereupon the forward end 63 of the base plate 24 is received within the recess 62. The screw 42 may be properly tightened such that the base plate 24 is clamped longitudinally between the recesses 20 and 62, thereby positively securing the reel 25 on the rod 10.

A particular feature of the present invention resides in the fact that due to the resilient, deformable character of the material from which the clamping means 30 is fabricated, upon proper tightening of the screw 42, the clamping means 30 will be slightly deformed or compressed. With this construction, the base plate 24 of the reel 25 is maintained under a state of compression, in much the same way that a lock washer or the like is maintained under a state of compression in order to assure against relative rotation of an associated screw, bolt or the like. Accordingly, once the clamping means 30 has been longitudinally adjusted to a position wherein the base plate 24 is clampingly received between and within the recesses 20 and 62, relative movement of the reel 25 with respect to the rod 10 is effectively prevented.

Another feature of the present invention resides in the fact that the clamping means 30 is fabricated of a synthetic plastic material and thus the member 30 will be impervious to the corrosive affects of moisture, particularly moisture incurred in connection with salt water fishing. Accordingly, the present invention assures against any corrosion of the clamping means 30 and against any corrosive adhesion thereof with either the associated fishing rod 10 or the adjustment screw 42, thereby providing for a long and durable operational life.

A second embodiment of the present invention is illustrated in FIGS. 4 and 5, which embodiment differs from that hereinabove described essentially in the manner in which an adjusting screw 70 engages and is operatively secured to an associated reel clamping means 72. More particularly, the adjusting screw 70 will be seen as having a somewhat different configuration than the aforedescribed screw 42 in that the spindle section 86 thereof is somewhat shorter and is formed with an enlarged radially inwardly extending annulus 88 on the terminal end thereof. The movable clamping means 72 is similar in construction to the aforedescribed clamping means 30 in that it is fabricated of a synthetic relatively deformable material, such as nylon, and comprises an integral portion upper hood 90 and a lower guideway portion 91. The rearward face of the clamping means 72 is provided with an undercut in the form of a socket or recess 92 for reception of one end of the associated reel base plate, such as the plate 24, of an associated fishing reel. A blind bore 94, slightly larger in diameter than the spindle section 86 of the adjusting screw 70, is formed in the forward end of the clamping means 72 and is provided with an internal radially inwardly extending shoulder 96 adapted to engage the annulus 88 in the spindle section 86 and thereby secure the clamping means 72 on the end of the adjustment screw 70. Due to the resilient nature of material from which the clamping means 72 is fabricated, upon insertion of the spindle section 86 into the bore 94 and the application of a compressive force to the members 70, 72, the inner end of the spindle section 86 will be forced into the bore 94 and the radial shoulder 96 will "snap" into the annulus 88, thus providing the desired journal support of the clamping means 72 and assuring against any relative longitudinal movement therebetween.

The movable clamping means 72 is longitudinally guided by means of a lower downwardly facing guide surface or face 98 which is longitudinally movable along an upwardly facing guide surface on a depressed reel seat 100 and is laterally confined by inwardly facing opposite wall surfaces of flange portions 102. Additional longitudinal guidance, of course, is also provided by reception of the lower guideway portion 91 within a slightly oversize reel seat guide slot 104 formed in the associated rod handle.

It may be noted that while the reel securing device of the present invention has been illustrated herein as being located forwardly of the associated fishing reel which it is intended to secure upon an associated fishing rod, the present invention, of course, is readily adapted to be mounted rearwardly of the fishing reel and thus engage the rearward end of the reel base plate instead of the forward end thereof. Additionally, it will be appreciated that the clamping hoods 30 and 72 may be fabricated of various materials other than nylon, delrin or the like, such as molded rubber or the like, provided that such alternate materials permit the above described compressive loading of the reel base plate and assure against corrosion of the members 30, 72, as hereinabove described. In this regard, it may be noted that the various materials from which the clamping means 30, 72 may be fabricated are readily adapted to be molded or cast by well known techniques, thereby obviating the need for complicated machining operations required on heretofore known and used reel securing devices.

While it will be apparent that the preferred embodiments illustrated herein are well calculated to fulfill the objects above stated, it will be appreciated that the present invention is susceptible to modification, variation and change without departing from the scope of the invention.

I claim:

1. In combination with a fishing rod having a reel mounting portion adapted to operatively support a fishing reel provided with an elongated longitudinally extending reel base plate,
   a longitudinally movable clamping means,
   reel base plate engagement means on said clamping means adapted for engagement with one end of the reel base plate,
   means for longitudinally adjusting said clamping means whereby said clamping means is movable toward and away from engagement with said reel base member,
   said clamping means being fabricated of a relatively deformable material and thereby being adapted to be maintained under a state of compression upon engagement thereof with said reel base plate so as to positively secure said fishing reel to said fishing rod,
   said means for adjustably moving said clamping means including adjustment screw means comprising an externally threaded body portion threadably received within a longitudinally extending threaded bore on said fishing rod, and means for journal supporting said clamping means on said adjustment screw means, whereby said adjustment screw means may be rotated without imparting rotary motion to said clamping means,
   said means for journal supporting said clamping means on said adjustment screw means comprising a generally cylindrically shaped spindle section on said adjustment screw means and means including a generally cylindrically shaped bore extending longitudinally of said clamping means and adapted to be mounted on at least a portion of said spindle section therein, and
   said clamping means being formed with a longitudinally extending blind bore and wherein said spindle section of said adjustment screw means projects interiorly of said blind bore.

2. In combination with a fishing rod having a reel mounting portion adapted to operatively support a fishing reel provided with an elongated longitudinally extending reel base plate,
   a longitudinally movable clamping means,
   reel base plate engagement means on said clamping means adapted for engagement with one end of the reel base plate,
   means for longitudinally adjusting said clamping means whereby said clamping means is movable toward and away from engagement with said reel base member,
   said clamping means being fabricated of a relatively deformable material and thereby being adapted to be maintained under a state of compression upon engagement thereof with said reel base plate so as to positively secure said fishing reel to said fishing rod,
   said means for adjustably moving said clamping means including adjustment screw means comprising an externally threaded body portion threadably received within a longitudinally extending threaded bore on said fishing rod, and means for journal supporting said clamping means on said adjustment screw means, whereby said adjustment screw means may be rotated without imparting rotary motion to said clamping means,
   said means for journal supporting said clamping means on said adjustment screw means comprising a generally cylindrically shaped spindle section on said adjustment screw means and means including a generally cylindrically shaped bore extending longitudinally of said clamping means and adapted to be mounted on at least a portion of said spindle section therein,
   retaining means on the terminal end of said spindle portion of said adjustment screw means for limiting relative longitudinal movement of said clamping means with respect to said adjustment screw means, and
   said adjustment screw means defining a generally radially disposed shoulder portion, and including means adjacent the end of said spindle section opposite said shoulder portion including a retaining ring cooperable with said shoulder portion for securing said clamping means on said adjustment screw means and providing for relative rotation therebetween.

3. In combination with a fishing rod having a reel mounting portion adapted to operatively support a fishing reel provided with an elongated longitudinally extending reel base plate,
   a longitudinally movable clamping means, reel base plate engagement means on said clamping means adapted for engagement with one end of the reel base plate, means for longitudinally adjusting said clamping means whereby said clamping means is movable toward and away from engagement with said reel base member, said clamping means being fabricated of a relatively deformable material and thereby being adapted to be maintained under a state of compression upon engagement thereof with said reel base plate so as to positively secure said fishing reel to said fishing rod, said means for adjustably moving said clamping means including adjustment screw means comprising an externally threaded body portion threadably received within a longitudinally extending threaded bore on said fishing rod, and means for journal supporting said clamping means on said adjustment screw means, whereby said adjustment screw means may be rotated without imparting rotary motion to said clamping means, said means for journal supporting said clamping means on said adjustment screw means comprising a generally cylindrically shaped spindle section on said adjustment screw means and means including a generally cylindrically shaped bore extending longitudinally of said clamping means and adapted to be mounted on at least a portion of said spindle section therein, said clamping means being formed with a longitudinally extending blind bore and wherein said spindle section of said adjustment screw means projects interiorly of said blind bore, retaining means on the terminal end of said spindle section of said adjustment screw means for limiting relative longitudinal movement of said clamping means with respect to said adjustment screw means, and a radially inwardly projecting portion in said blind bore and a radially inwardly formed annulus on said spindle section adapted to receive said portion for securing said clamping means to said adjustment screw means and providing for relative rotation therebetween.

4. A fishing rod having a handle portion and comprising:

a longitudinally extending reel seat on said handle portion, guideway means adjacent said reel seat, longitudinally displaceable reel clamping means movably mounted on said guideway means for movement between a reel clamping position and a reel releasing position, threaded mounting means on said handle portion adjacent said reel seat and having a central axis extending generally parallel to the longitudinal axis of said reel seat, adjustment screw means having a threaded portion associated with said threaded mounting means and being rotatively and axially displaceable relative thereto, and connecting means between said adjustment screw means and said reel clamping means causing transmittal of only linear displacement forces from said adjustment screw means to said reel clamping means and only linear longitudinal axial displacement of said clamping means relative to said reel seat and said rod handle, said connecting means comprising spindle means operatively loosely slidably supporting said reel clamping means, said connecting means further comprising abutment means operative between said adjustment screw means and said clamping means to transmit substantially only axially directed forces therebetween to slidably displace said clamping means along said guideway means, said clamping means being made of a low friction resilient compressible material so as to reduce friction between said clamping means and said spindle means and said abutment means to reduce transmittal of rotative forces therebetween and to permit compressive engagement of said clamping means with a reel.

5. The invention as defined in claim 4 wherein said spindle means comprising:

a smooth surfaced shaft portion carried by said adjustment screw means and extending longitudinally beyond said threaded portion thereof, and said connecting means comprising a bore in said clamping means of larger diameter than said shaft portion.

6. The invention as defined in claim 5 wherein said bore extending completely through said clamping means, and said shaft portion extending completely through said bore.

7. The invention as defined in claim 5 wherein said abutment means comprising a shoulder means between said threaded portion and said shaft portion of said adjustment screw engageable with said clamping means in one direction of rotation to cause linear movement of said clamping means in one direction, and a second shoulder means on said shaft portion of said adjustment screw and being axially spaced from said first shoulder means and enageable with said clamping means in an opposite direction of rotation to cause linear movement of said clamping means in an opposite direction.

8. The invention as defined in claim 4 wherein said abutment means comprising:

a first shoulder means located beyond said threaded portion and operative between said adjustment screw means and said clamping means in one direction of rotation of said adjustment screw means to cause linear movement of said clamping means in one direction, and second shoulder means located beyond said threaded portion and axially spaced from said first shoulder means and operative between said adjustment screw means and said clamping means in an opposite direction of rotation of said adjustment screw means to cause linear movement of said clamping means in an opposite direction.

9. The invention as defined in claim 5 wherein said abutment means comprising:

a groove in said shaft portion, a rib in said bore, said rib being resiliently compressible to permit sliding movement of said shaft portion relative thereto during assembly and being located in said groove after assembly to retain said clamping means on said shaft portion.

* * * * *